US007089333B2

(12) United States Patent
Marinescu et al.

(10) Patent No.: US 7,089,333 B2
(45) Date of Patent: Aug. 8, 2006

(54) AUDIO DATA TRANSMISSION SYSTEM BETWEEN A MASTER MODULE AND SLAVE MODULES BY MEANS OF A DIGITAL COMMUNICATION NETWORK

(75) Inventors: Marian Marinescu, Montbonnot Saint Martin (FR); Yves Ansade, Vaulnaveys le Bas (FR); Jeremie Weber, Grenoble (FR)

(73) Assignee: Digigram, Montbonnot Saint Martin (FR)

( * ) Notice: Subject to any disclaimer, the term of this patent is extended or adjusted under 35 U.S.C. 154(b) by 936 days.

(21) Appl. No.: 10/055,918

(22) Filed: Jan. 28, 2002

(65) Prior Publication Data

US 2003/0050989 A1 Mar. 13, 2003

(30) Foreign Application Priority Data

Sep. 10, 2001 (FR) .................................. 01 11656

(51) Int. Cl.
*G06F 15/16* (2006.01)

(52) U.S. Cl. ........................ 709/248; 709/231; 84/119

(58) Field of Classification Search ........ 709/230–234, 709/248; 84/119
See application file for complete search history.

(56) References Cited

U.S. PATENT DOCUMENTS

| | | | |
|---|---|---|---|
| 5,783,767 A | 7/1998 | Shinsky | |
| 5,886,275 A | 3/1999 | Kato et al. | |
| 6,115,823 A * | 9/2000 | Velasco et al. | 713/322 |
| 6,353,169 B1 * | 3/2002 | Juszkiewicz et al. | 84/600 |
| 6,751,228 B1 * | 6/2004 | Okamura | 370/412 |
| 6,909,728 B1 * | 6/2005 | Kuribayashi et al. | 370/518 |
| 2003/0156218 A1 * | 8/2003 | Laksono | 348/388.1 |

FOREIGN PATENT DOCUMENTS

| | | |
|---|---|---|
| EP | 0 762 684 A2 | 3/1997 |
| EP | 0 855 697 A1 | 7/1998 |
| WO | WO 00/65571 | 11/2000 |

* cited by examiner

*Primary Examiner*—David Wiley
*Assistant Examiner*—Phuoc H. Nguyen
(74) *Attorney, Agent, or Firm*—Oliff & Berridge, PLC

(57) ABSTRACT

The system comprises a master module and slave modules able to be chain-connected and/or star-connected by means of a digital communication network, for example of the Ethernet type. The system is synchronized on the master module clock that supplies synchronization information to all the data frames it sends over the network. Each slave module reconstitutes the clock from the frames it receives. The data frames comprise data packets that can in particular be command data, audio data or video data. Each packet comprises a header describing the content of the packet. Each slave module knows at which location of a packet the data intended for it is located and at which location of a packet it can insert data.

20 Claims, 8 Drawing Sheets

AUDIO DATA TRANSMISSION SYSTEM BETWEEN A MASTER MODULE AND SLAVE MODULES BY MEANS OF A DIGITAL COMMUNICATION NETWORK

BACKGROUND OF THE INVENTION

The invention relates to a system comprising a digital communication network for data transmission, comprising audio type data, between a master module and a plurality of slave modules, each module comprising at least one network terminal to connect the communication network to the module, at least one network terminal of a slave module being connected to a network terminal of another module by means of the communication network.

State of the Art

The document WO-A-0,065,571 discloses an audio communication system enabling digital audio data to be transmitted between a plurality of audio devices via a digital communication network at 100 Megabits/s. This document concerns more particularly a system comprising at least one musical instrument and various electronic components designed for checking and reproducing the sounds generated by this instrument, for example when broadcasting live. The system described in this document does not enable an existing network, whatever its architecture, to be used. It in fact implies chain connection of the different audio devices that constitute it. In addition, each of the devices has to comprise a specific communication interface with the network which prevents the use of an existing network comprising for example standard switching units not comprising such an interface. The system described is moreover costly and requires large resources.

Audio communication systems also exist using an Ethernet type communication network between a master module and star-connected slave modules. Data transmission is performed in isochronous manner, which is not suitable for all applications in particular in the case where perfect synchronism would be indispensable. For example, such a system can be used in a stadium or in a hotel to transmit audio data to two loudspeakers located in two different rooms. It does not on the other hand enable live retransmission with very precise synchronization.

Object of the Invention

The object of the invention is to achieve an audio data transmission system not presenting the shortcomings of known systems. Such a system must in particular enable an existing communication network to be used, whatever its architecture, to transmit data in perfectly synchronous manner with a very low transmission latency.

According to the invention this object is achieved by the fact that the master module comprises a synchronization clock and supplies data frames comprising synchronization information on its network terminal, each slave module comprising clock reconstitution means, from the synchronization information of the data frames received on its network terminal, and recognition means, synchronized by the associated clock reconstitution means, to recognize the data intended for said slave module so as to ensure synchronous transmission of the data within the system.

According to a development of the invention, a data frame comprises at least one packet, each packet comprising a header with a descriptor of the type and number of data contained in the packet, a module comprising means for determining, from the descriptor, whether a part of the packet is intended for it.

According to a preferred embodiment, a slave module comprises means for inserting data to be retransmitted over the network in a predetermined part of a packet. A data frame can comprise command data intended for a slave module comprising means for applying the command data to an input or an output of the slave module.

According to another feature of the invention, the communication module comprises chain-connected and/or star-connected modules.

BRIEF DESCRIPTION OF THE DRAWINGS

Other advantages and features will become more clearly apparent from the following description of particular embodiments of the invention, given as non-restrictive examples only and represented in the accompanying drawings, in which.

DESCRIPTION OF PARTICULAR EMBODIMENTS

Figure 1:
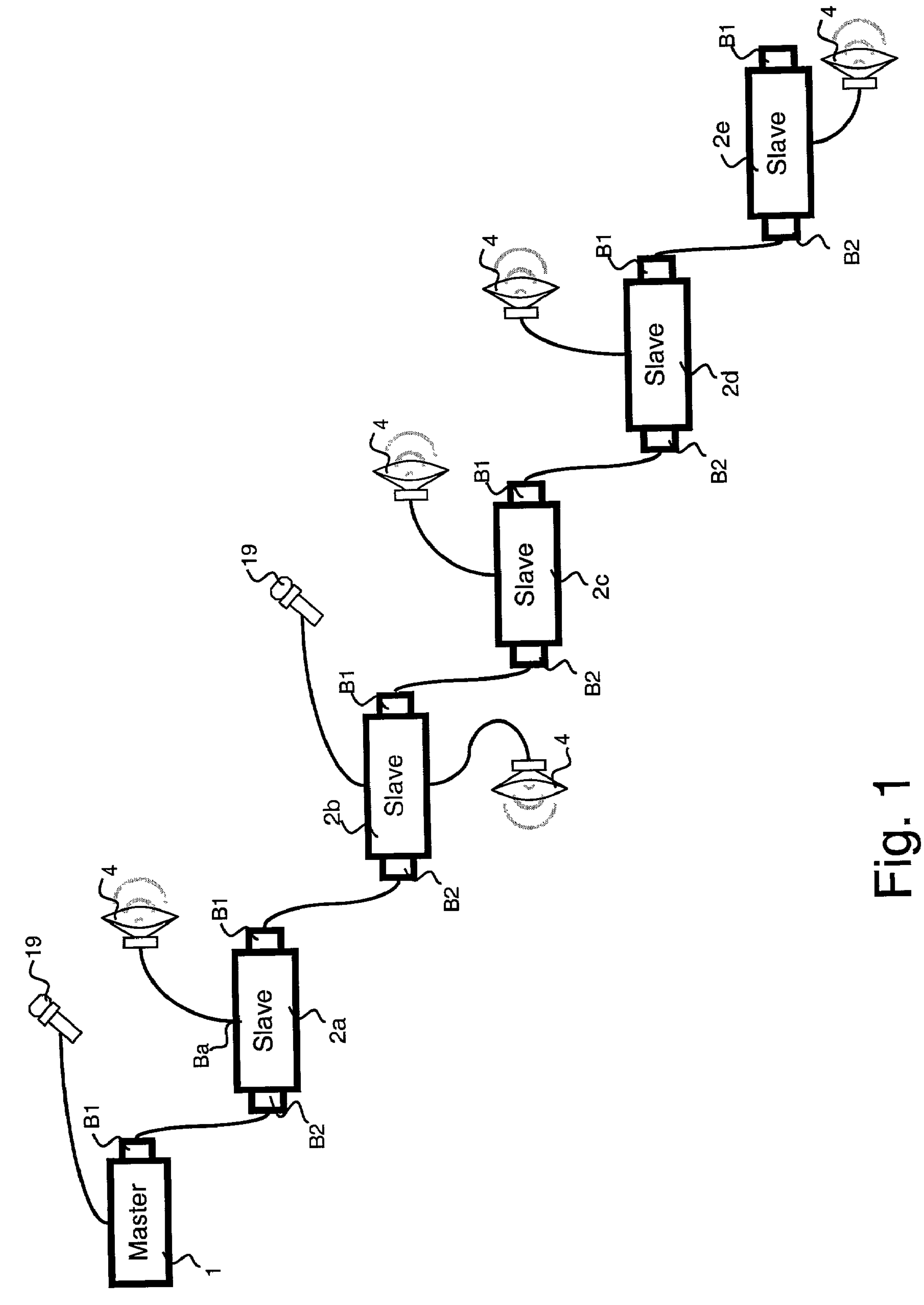
FIGS. 1 to 3 illustrate three variants of configuration of a system according to the invention.
Figure 2:
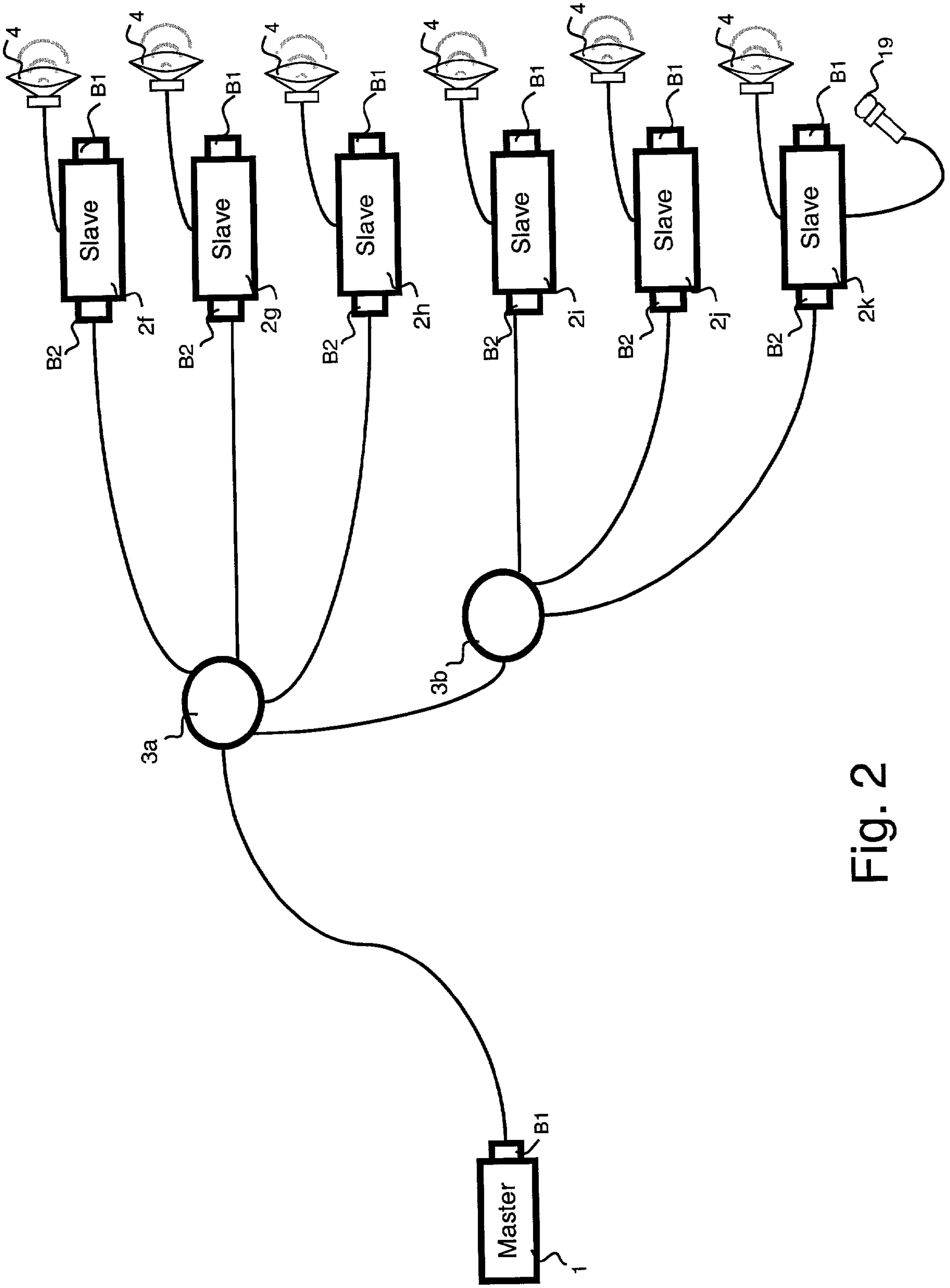
Figure 3:
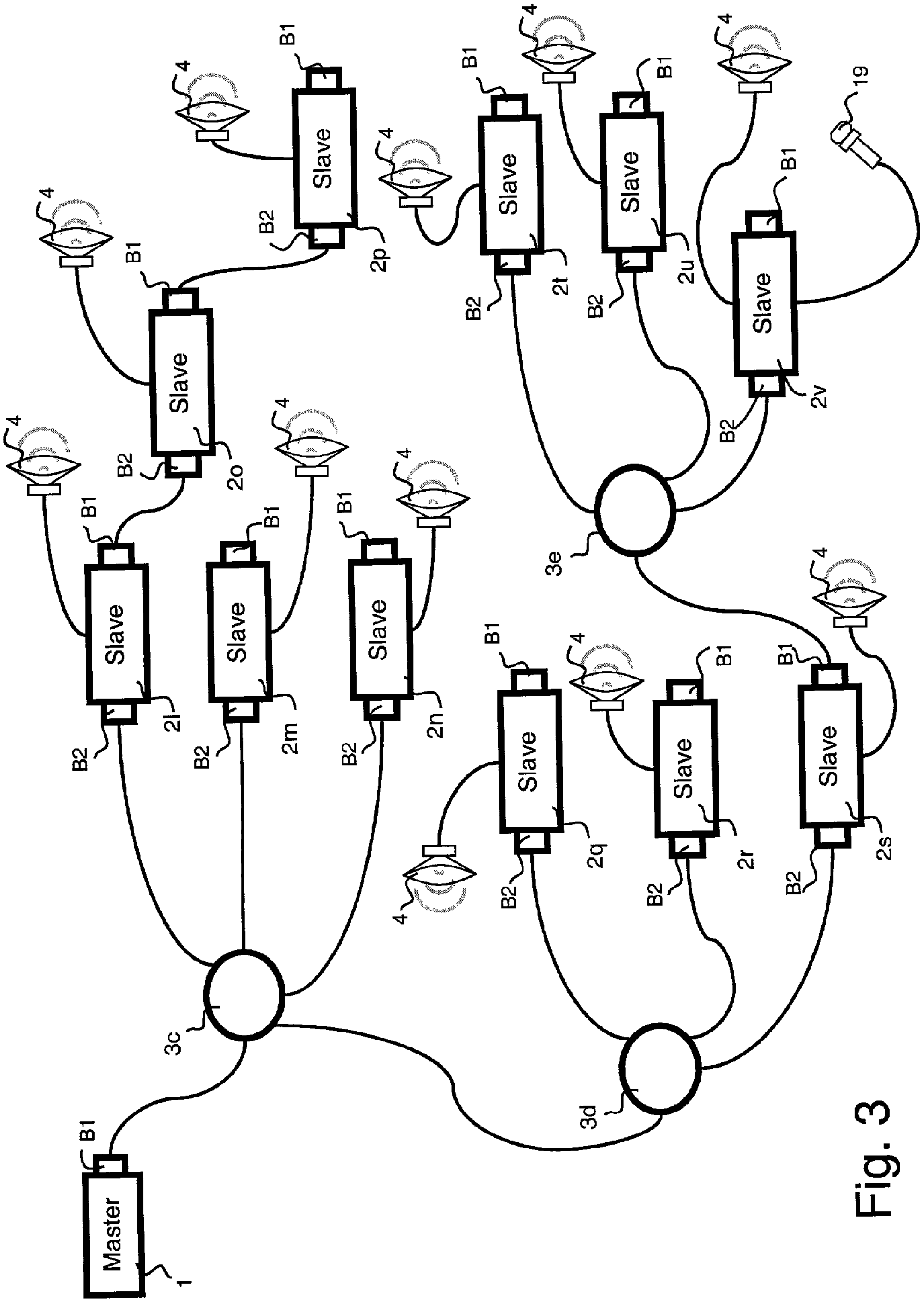

Whatever its particular configuration, a system according to the invention, as represented in FIGS. 1 to 3, comprises a single master module 1 and a plurality of slave modules 2.

In FIG. 1, the modules are connected so as to form an open chain. The master module 1 comprises a port constituting a first network terminal B1 connected by means of a two-way communication network preferably of the Ethernet type to a port constituting a second network terminal B2 of a first slave module 2*a*. The latter comprises another port constituting a first network terminal B1 connected to the second network terminal B2 of a second slave module 2*b*. In the particular embodiment of FIG. 1, five slave modules 2*a* to 2*e* are connected in series, the first network terminal B1 of one of the slave modules being connected to the second network terminal B2 of the next slave module. The first network terminal B1 of the last slave module 2*e* is not connected to the communication network whereas the second terminal B2 of the first slave module 2*a* of the chain is connected to the first network terminal B1 of the master module 1.

In FIG. 2, the modules are star-connected. All the second network terminals B2 of the slave modules 2 are connected by means of the communication network to the first network terminal B1 of the master module 1. In the particular embodiment illustrated in FIG. 2, six slave modules are divided into two groups. The second network terminals B2 of a first group of three slave modules 2*f*, 2*g* and 2*h* are respectively connected to three individual terminals of a switching unit 3*a*. This unit comprises a common terminal able to be connected to each of its individual terminals and, via the communication network, to the first network terminal of the master module 1. The second network terminals of a second group of slave modules 2*i*, 2*j* and 2*k* are connected respectively to three individual terminals of a switching unit 3*b*, comprising a common terminal connected to a fourth individual terminal of the switching unit 3*a*. None of the first network terminals B1 of the slave modules are connected to the communication network.

The configuration of the system illustrated in FIG. 3 is more complex and comprises both chain-connected modules and star-connected modules. The first network terminal B1 of the master module is connected to the common terminal of a switching unit 3*c*. The latter comprises four individual terminals respectively connected to the second network terminals of three slave modules 2*l*, 2*m* and 2*n*, and to the common terminal of a switching unit 3*d*. The slave module 2*l* is connected in series with two other slave modules 2*o* and 2*p*. The switching unit 3*d* comprises three individual terminals respectively connected to the second network terminals of three slave modules 2*q*, 2*r* and 2*s*. The slave module 2*s* is star-connected with three slave modules 2*t*, 2*u* and 2*v*, by means of a switching unit 3*e*. The latter comprises a common terminal connected to the first terminal B1 of the slave module 2*s* and three individual terminals respectively connected to the second terminals B2 of the slave modules 2*t*, 2*u* and 2*v*. The first terminals B1 of the slave modules 2*m*, 2*n*, 2*p*, 2*q*, 2*r*, 2*t*, 2*u* and 2*v* are not connected to the communication network.

The switching units 3 are standard items conventionally used in known networks, for example in Ethernet type networks, to perform star connections.

The three variants described above are only examples of embodiments, the scope of the invention extending to any type of architecture connecting a master module 1 with slave modules 2 by means of a communication network.

In the embodiments of FIGS. 1 to 3, each slave module 2 comprises an analog audio output terminal Ba connected to the input of a loudspeaker 4. In addition, certain modules (1 and 2*b* in FIG. 1, 2*k* in FIG. 2 and 2*v* in FIG. 3) comprise an analog or digital audio input terminal connected to the output of a mike 19.

Figure 4:
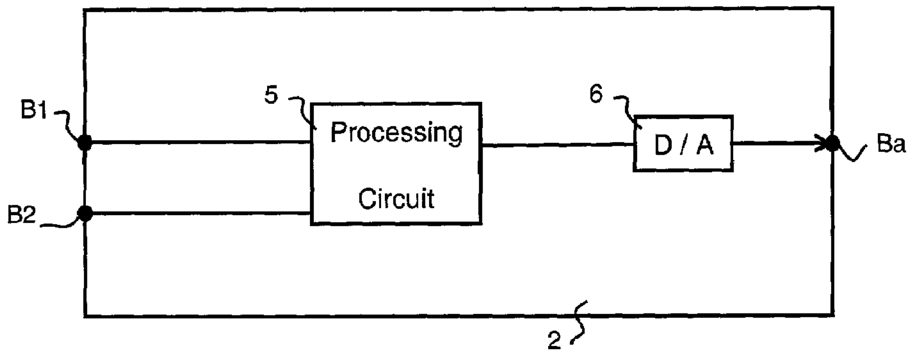
FIG. 4 schematically illustrates a particular embodiment of a slave module of a system according to FIGS. 1 to 3.

A slave module 2, represented schematically in FIG. 4, comprises a processing circuit 5, for example microprocessor-based, connected by two-way links to the first and second network terminals B1 and B2 to enable connection thereof to the communication network. The processing circuit 5 is also connected via a digital-to-analog converter to the analog audio output terminal Ba of the module. It can also be connected to an analog audio input terminal via an analog-to-digital converter (not represented).

Figure 5:
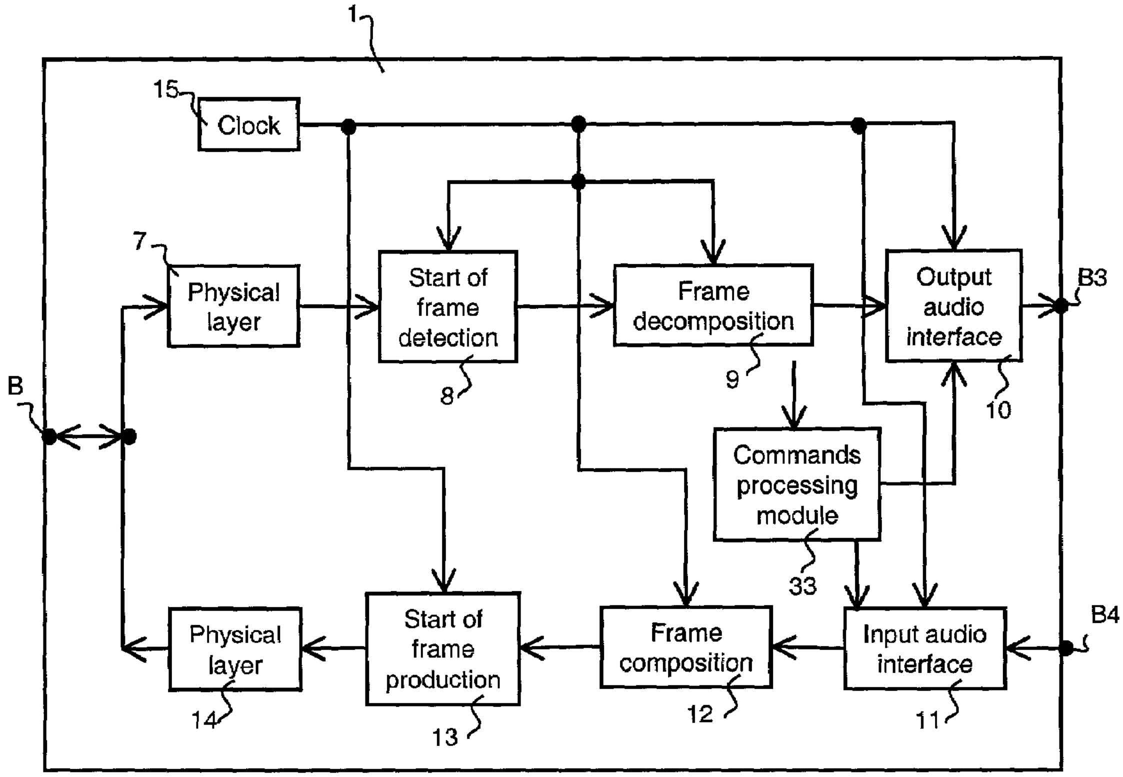
FIGS. 5 and 6 respectively illustrate in more detailed manner, in the form of a functional block diagram, a particular embodiment of a master module (FIG. 5) and of a slave module (FIG. 6).
Figure 6:
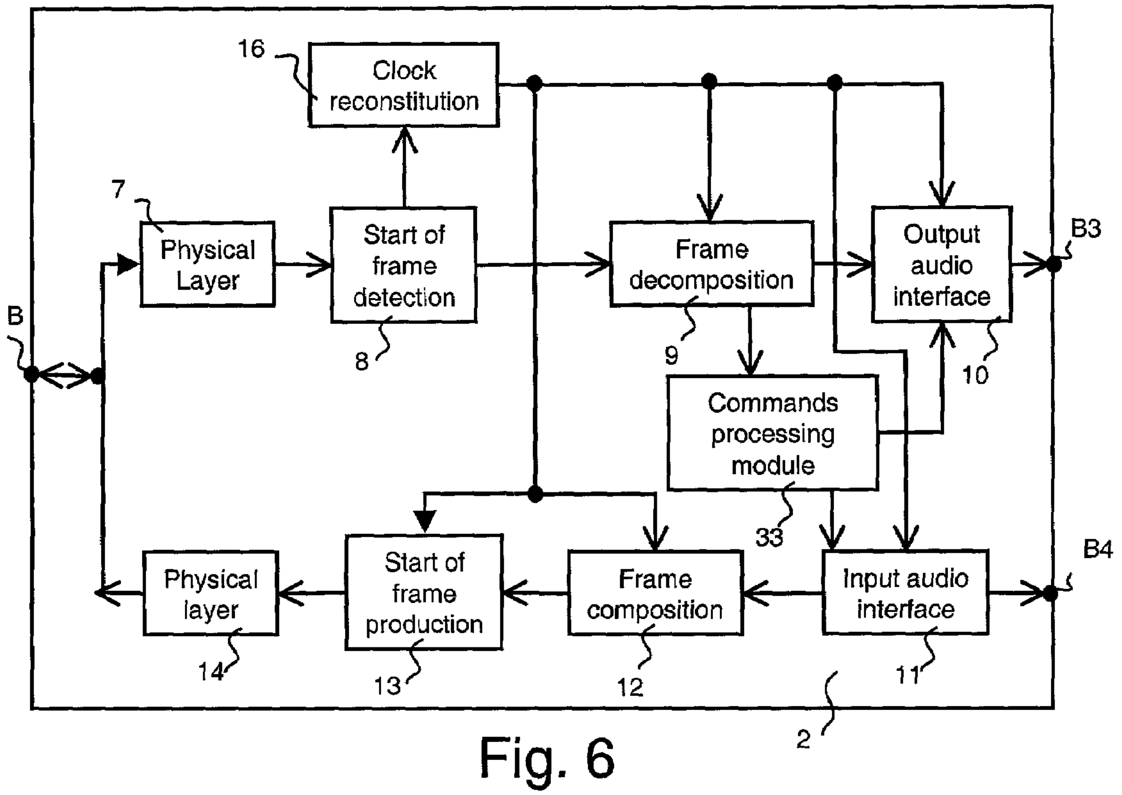

FIGS. 5 and 6 represent in greater detail the functions respectively performed by the processing circuit of a master module 1 and by the processing circuit of a slave module 2. In the master module 1 (FIG. 5), the signals coming from a network terminal B are applied via a first physical layer 7 to a start of frame detection unit 8 that supplies appropriate signals to a frame decomposition unit 9. The latter is connected via an output audio interface 10 to a digital audio output terminal B3. A digital audio input terminal B4 (whereto a mike 19 of digital type can for example be connected) is connected via an input audio interface 11 to a frame composition unit 12. The latter unit supplies signals representative of the frame to be transmitted to the network terminal B via a start of frame production unit 13 and a second physical layer 14. A clock 15 synchronizes operation of the units 8 to 13 of the module and enables the frame composition unit 12 to introduce synchronization pips in each frame. The different units of the module can be constituted in any known manner and will not be described in greater detail.

In the embodiment represented in FIG. 5, the master module 1 also comprises a commands processing module 33 connected between the frame decomposition unit 9 and the audio interfaces 10 and 11. The master module 1 can thus apply command data corresponding to simple command functions (amplitude, . . . ) to one of its inputs or outputs.

The slave module 2 represented in FIG. 6 only differs from the master module 1 of FIG. 5 by the absence of the clock 15. The latter is replaced by a clock reconstitution unit 16 that reconstitutes a clock from synchronization information contained in the frames and detected by the start of frame detection unit 8. For this, the frame descriptor 32 and specific type 26, described below respectively in connection with FIGS. 8 and 9, have to comply with a preset model.

In each module, the processing circuit essentially performs the functions of synchronization, receipt of frames applied to its network terminals, recognition of the data it has to transmit to its outputs, in particular to its digital audio output B3 or analog output Ba, or that it has to recover for writing in internal variables, insertion of data present on its digital inputs (for example on a digital audio input B4) or of internal variables (for example in response to a variable read command) in frames to be transmitted over the network.

Figure 7:
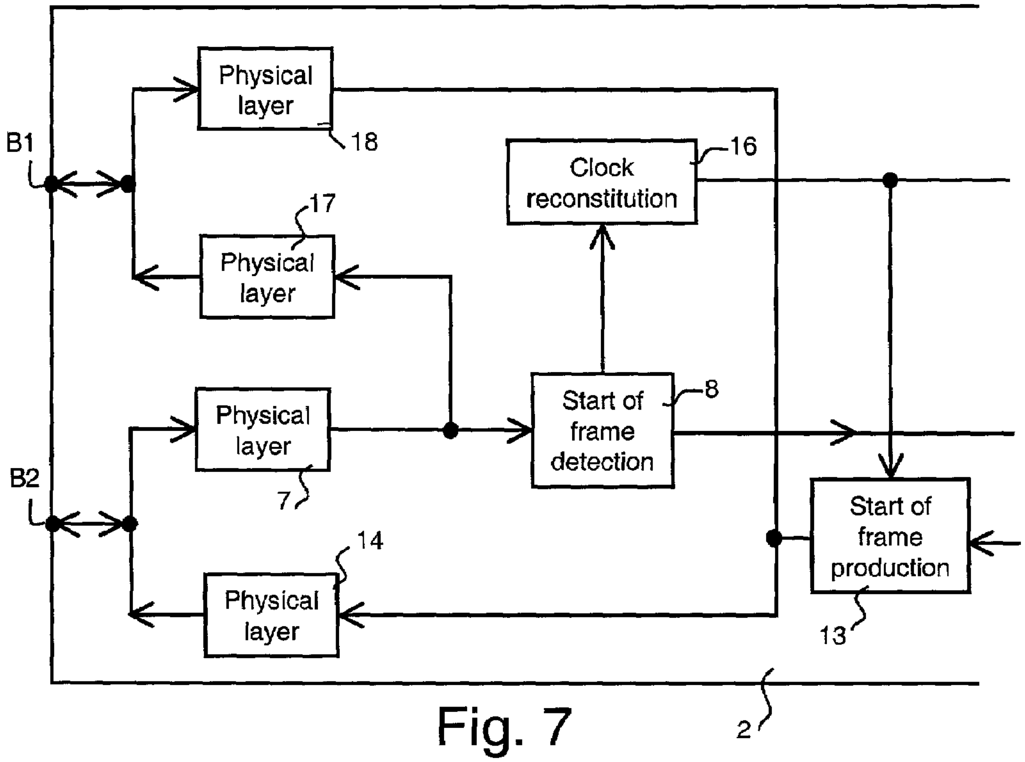
FIG. 7 illustrates an alternative embodiment of a slave module according to FIG. 6.

To enable chain connection of the modules, in an alternative embodiment partially represented in FIG. 7, a slave module 2 comprises two network terminals B1 and B2. The first and second physical layers 7 and 14 are then associated to the second network terminal B2. Third and fourth physical layers 17 and 18 associated to the first network terminal B1 are then respectively connected to the first and second physical layers. In this way, a frame coming from the second network terminal B2 can be transmitted without modification to the first network terminal B1 via the physical layers 7 and 17. Likewise, a frame coming from the first network terminal B1 can be transmitted without modification to the second network terminal B2 via the physical layers 18 and 14.

Although the analog audio terminal Ba is not represented in FIGS. 5 to 7, such a terminal is preferably provided in each module, the digital-to-analog converter 6 being connected to the output of the output digital audio interface 10. An analog audio terminal can be connected via an analog-to-digital converter to the input of the input digital audio interface 11. The digital audio terminals B3 and B4, not represented in FIG. 4, are also preferably provided in each module. The input digital audio terminal B4 in particular supplies to a module digital audio data, for example from a mike 19, to be transmitted in data frames on the network. Likewise, the output digital audio terminal B3 enables a module to transmit to any digital audio equipment connected thereto, digital data intended for it, contained in the data frames coming from the network.

In a preferred embodiment, all the modules are identical, any one module being able to be configured as master module or as slave module. However, each system always comprises a single master module so as to perform synchronization of all the modules on the master module clock from the synchronization information transmitted in the data frames.

Each master or slave module is associated to a single address and a data frame comprises a preamble, a destination address, a source address, and the data to be transmitted from the module corresponding to the source address to the module corresponding to the destination address.

The frames used comply with the frame format compatible with an Ethernet type network so as to enable connection of the modules by any full duplex Ethernet network. The number of usable channels depends on the network passband.

The use of a single master module combined with a network operating in full duplex eliminates the problem of collision management. The master module 1 sends data frames over the network intended either for a predetermined slave module 2 or for a group of slave modules, or for all the slave modules. In the latter two cases, the master module 1 supplies as destination address either a multicast address or a broadcast address to transmit data simultaneously to a group of slave modules or respectively to all the slave modules 2.

Figure 8:
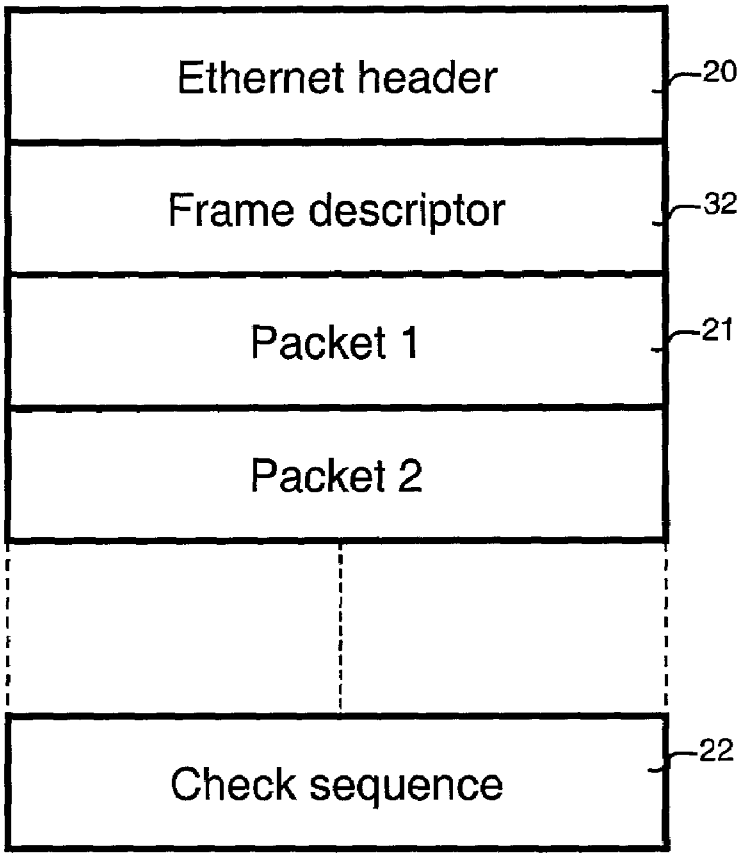
FIG. 8 illustrates the general structure of a frame.

The general structure of a frame is illustrated in FIG. 8. It first comprises a header 20, of Ethernet type in the embodiment represented. The header 20 is followed by a frame descriptor 32 that supplies a sub-type, a version number, the number of packets, the packet length, information on the master module frequency and a frame incremental number. The frame descriptor 32 is followed by at least one packet 21 (packet 1, packet 2, etc . . . ) and the frame ends with a frame check sequence 22. This check can be performed by any known means compatible with Ethernet specifications, for example by a cyclic redundancy check.

Figure 9:
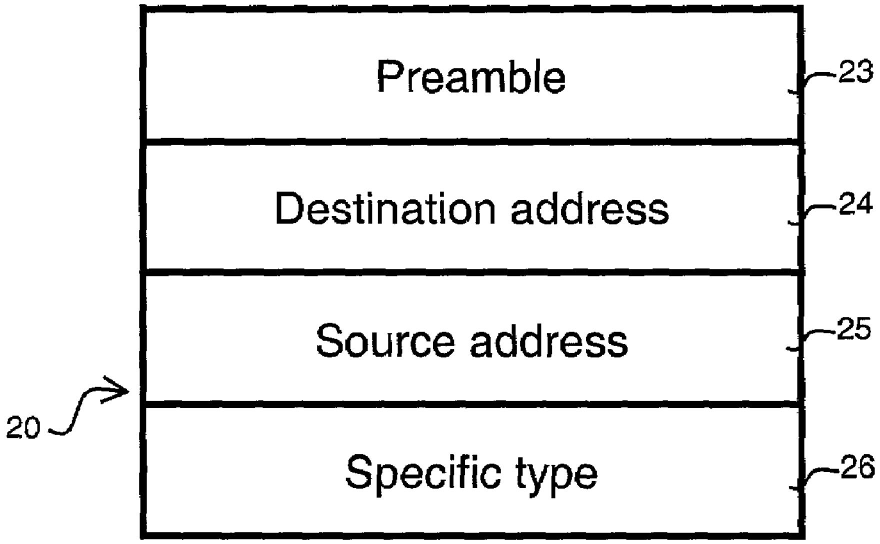
FIG. 9 represents in greater detail the structure of the frame header according to FIG. 8.

Each module is associated to a single address and, as represented in FIG. 9, the header 20 of each frame comprises a preamble 23, a destination address 24 and a source address 25. It also comprises a specific type 26 specific to the application. The specific type preferably uses predetermined fields of a standard Ethernet type header, such as the Length or Type Field (LTF), the Sub Type Field (STF) and the Protocol Version Number Field (PVNF) to define the type of protocol used. The specific type 26 also specifies the frequency of the master module clock 15, the number of packets 21 of the frame and the number of bytes of the frame. The number of packets 21 is preferably comprised between 1 and 32, the number of bytes, compatible with an Ethernet network, being comprised between 46 and 1500. The specific type 26 also comprises a Master Clock Incremental Number (MCIN) that is incremented at each transmission of a frame by the master module 1 to enable resynchronization of a slave module 2 even in case of loss of a frame in the course of transmission over the network. Each slave module comprises for this purpose a counter that is incremented each time a frame is lost, i.e. when the clock incrementation field of the received frame does not contain the incremented value of the clock incrementation field of the previous frame.

Figure 10:
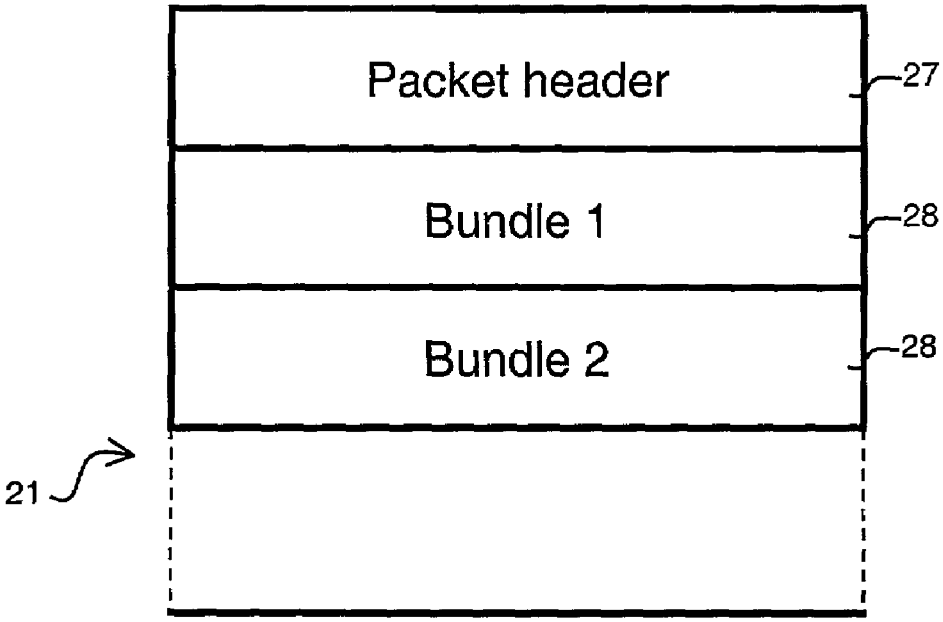
FIG. 10 illustrates in greater detail the structure of a frame packet according to FIG. 8.

As represented in FIG. 10, each packet 21 comprises a packet header containing the description of the packet involved, and a set of bundles 28 (bundle 1, bundle 2, etc . . . ) containing the data to be transmitted.

Figure 11:
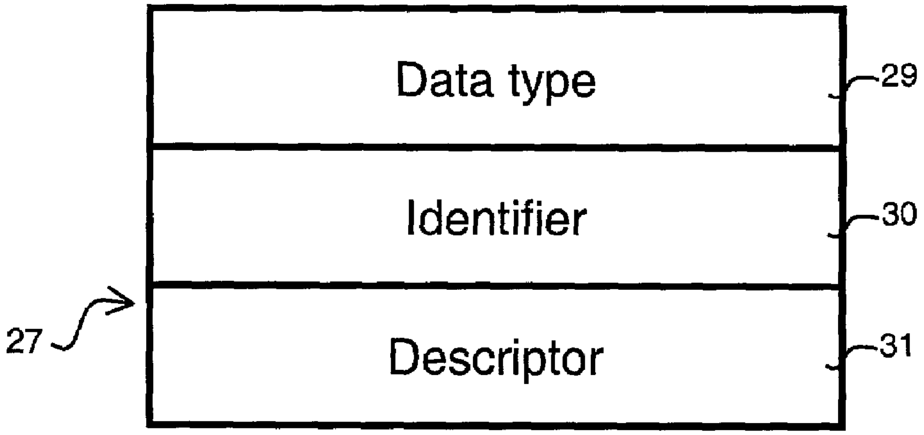
FIG. 11 illustrates in greater detail the structure of a packet header of a packet according to FIG. 10.

The packet header 27 identifies the packet involved and describes the number and type of items of information contained in the packet. It provides a description of the data contained in the packet, of its characteristics and its location in the packet. It comprises (FIG. 11) in particular a field 29, for example on 2 bits, defining the type of data contained in the packet. Each packet is in fact preferably dedicated to a data type: command data, audio data, video data, digital data of any kind. In a particular embodiment, each frame comprises two packets, one containing command data and the other containing audio data. Such command data can for example concern the amplitude of emission of sounds by a loudspeaker 4 connected to the slave module 2 for which it is intended. It is then transmitted by the processing circuit 5 of this slave module 2 to its audio output to control the loudspeaker 4 accordingly.

The packet header 27 also comprises an identifier field 30 and a descriptor field 31. The identifier field defines for which module and for which input or output of a slave module, i.e. for which piece of equipment (for example for which loudspeaker 4 or for which mike 19) the command data of each bundle is intended. It can also define the transmission frequency, different transmission frequencies being able to be used for the different packets. The descriptor field 31 in particular specifies the order of the words in the bundles (first word of the bundle first or last word of the bundle first), the size of the words (at least one byte), the order of the bits in the word, the number of bundles and the number of words per bundle. As a non-restrictive example, an audio data packet can comprise 3 bundles of 2 words each, with 24 bits per word.

Each slave module 2 comprises n registers respectively associated to n inputs or outputs of the module and descriptor registers defining the state and configuration of the slave module. A register associated to an input or an output of a module comprises information (packet type, packet identifier, bundle number, etc . . . ) enabling the data that the slave module has to select to be identified in a frame. Thus each module is programmed to use the data situated at certain locations in a frame to command and/or send data, audio data for example, to a piece of equipment connected to a predetermined output of the module.

A slave module can not only use data contained in a frame that it receives but can also insert data in a frame that it has received and that it retransmits over the network either to another slave module or to the master module. This is notably the case of a slave module comprising an input connected to a mike 19 (slave modules 2*b* of FIG. 1, 2*k* of FIG. 2 and 2*v* of FIG. 3). The register of the slave module associated to this input specifies in which bundle this data has to be inserted. In the case where a slave module 2 adds data in a frame, it modifies the check sequence 22 of the frame accordingly. If the modified frame is intended for the master module 1, it also modifies the source address (normally formed by the address of the master module) to replace it by its own address.

In the general case, a slave module receiving on one of its terminals a frame that is not intended for it retransmits this frame over the network, without any modification, via its other network terminal. A slave module situated at the end of a branch of the network, i.e. the terminal B1 whereof is not connected to the network, can be pre-programmed either not to retransmit a frame received on its network terminal B2 or, if necessary, to retransmit it via the same network terminal B2 to the master module or another predetermined slave module.

To give an example, the slave module 2*e* of FIG. 1 can be pre-programmed to send a frame to the master module 1. The slave module 2*f* of FIG. 2 can be pre-programmed in three different modes. In a first mode, it does not retransmit the frames it receives. In a second mode, it retransmits the frames received to the master module 1. However, if this second mode is used for all the end slave modules in the case of a star-connected configuration (modules 2*f* to 2*k* in FIG. 2), this may create problems of bottlenecks on the network when all the frames are submitted to the master module. To avoid this type of problem, in a third mode, an end slave module is programmed to send the frames to another slave module. In FIG. 2, for example, the slave module 2*f* can be programmed to send the frames to the slave module 2*g*, the latter sending them on to the slave module 2*h*. The frames intended for the slave module 2*f* thus go successively from the master module 1 to the switching unit 3*a*, to the slave module 2*f*, to the switching unit 3*a*, to the slave module 2*g*, to the switching unit 3*a*, to the slave module 2*h*, to the switching unit 3*a*, to the switching unit 3*b*, to the slave module 2*i*, to the switching unit 3*b*, to the slave module 2*j*, to the switching unit 3*b* and to the slave module 2*k*. The latter can then submit them to the master module 1 via the switching units 3*b* then 3*a*.

The switching units then have to be programmed accordingly. The switching unit 3*c* (FIG. 3), for example, recognizes the destination addresses in the frames it receives from the master module 1. If the destination address corresponds to the address of one of the slave modules 2*l*, 2*o* or 2*p*, it transmits the frame to the slave module 2*l*. If on the other hand the destination address corresponds to the address of one of the slave modules 2*s*, 2*t*, 2*u* or 2*v*, it transmits the frame to the switching unit 3*d* which transmits it to the slave module 2*s*. The switching unit 3*c* is also programmed to recognize the destination address corresponding to the slave module 2*m* in the frames, whether the latter originate from the master module 1 or from the slave module 2*p* (via the slave modules 2*o* and 2*l*). The slave module 2*p* can thus be programmed to send the frames to the slave module 2*m*.

All the frames, with their synchronization pips, are generated by the master module 1. The slave modules can read the data contained in a frame and possibly insert data at a predetermined location of the frame, but they can in no case create a new frame.

The network is a two-way communication network, preferably of the Ethernet type. The clock 15 preferably has a frequency corresponding to the sampling frequencies conventionally used on the Ethernet network, i.e. 32 KHz, 44.1 KHz, 48 KHz, 88.2 KHz or 96 KHz. It can also have a frequency corresponding to a sub-multiple of these frequencies. In this case, several data samples are transmitted in each bundle. For example, for transmission of audio data sampled at 48 KHz, a 12 KHz clock transmitting 4 samples per bundle can be used.

The clock 15 can also have a frequency that is not a sub-multiple of the data sampling frequency. For example, a 48 KHz clock can be used when transmitting audio data sampled at 44.1 KHz, with one or zero samples per bundle.

For certain applications, it is possible to limit data transmission to one-way transmission between the master module and slave modules. This enables the protocol to be simplified and consequently enables the cost of the modules to be reduced.

To limit the cost, it is possible, in certain applications, to replace the dynamic frames, whose length and content are not fixed, by frames of preset length and content.

Although the invention has been described for audio data transmission, it also applies to the case where the data frames comprise data of any type, for example video data.

Figure 12:
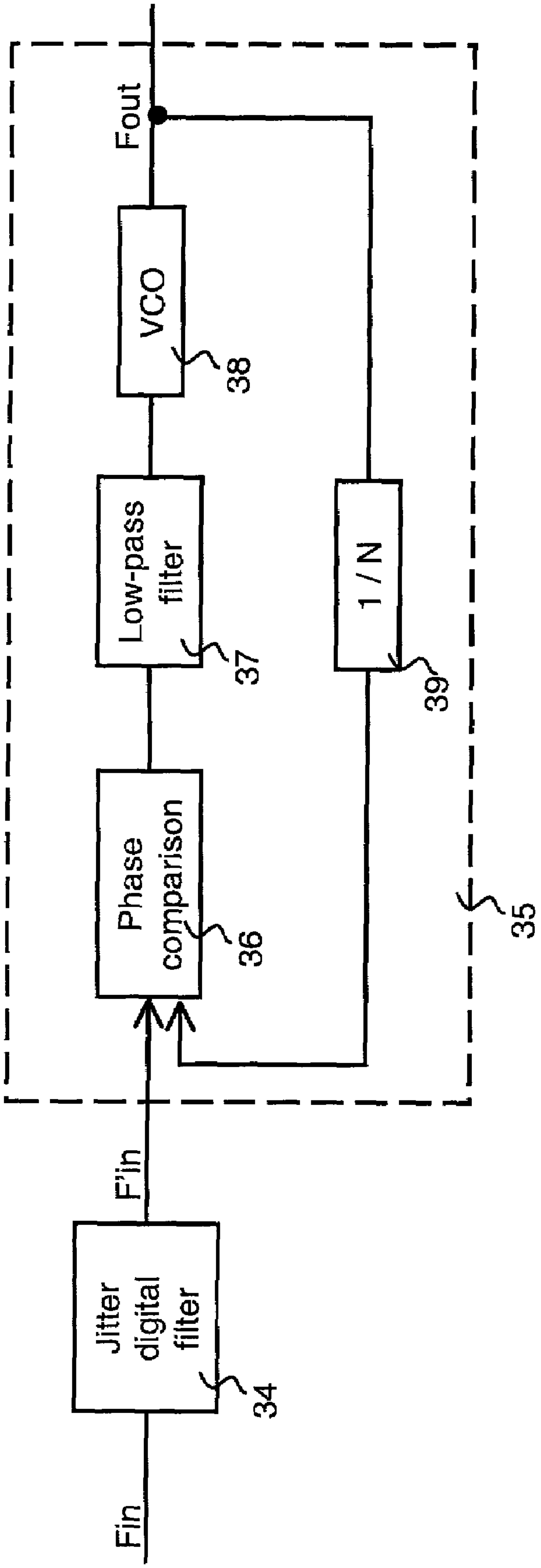
FIG. 12 illustrates an alternative embodiment of a slave module clock reconstitution unit.

The clock reconstitution unit 16 (FIG. 6) can be constituted by any suitable circuit. It conventionally comprises a Phase Lock Loop (PLL) designed to loop-lock the output frequency Fout of the unit to the input frequency Fin of the synchronization pips coming from the data frames applied to the associated start of frame detection unit 8. However, with conventional loop-lock regulation circuits, the jitter that may be present in the frequency signals applied to the phase lock loop input is found in the loop output frequency signals. To minimize jitter in the output signals Fout, a jitter digital filter 34 is preferably connected up-line from the phase lock loop 35, as represented in FIG. 12. The filter 34 is a recursive digital filter, of low-pass type, at least of first order. The frequency signals Fin applied thereto are filtered and the filter 34 supplies signals F'in applied to the input of the phase lock loop 35 in which the jitter is eliminated or at least reduced. The phase lock loop 35 comprises, conventionally, a phase comparison circuit 36 in series with a low-pass filter 37 and a voltage-controlled oscillator (VCO) 38. The phase comparison circuit 36 comprises a first input connected to the output of the jitter digital filter 34 and a second input connected to the output of the oscillator 38 by means of a divider 39. It thus receives the signals F'in and Fout/N on input, N being a preset integer.

The communication network can also be formed by a serial link or by a carrier current network. In the latter case, the configuration of the system may be different from those represented in FIGS. 1 to 3. The first network terminal B1 of the master module 1 can in fact be connected via the carrier current network to the second network terminals B2 of all the slave modules 2: the terminal B1 of the master module 1 is connected to the terminal B2 of a slave module itself connected to the terminal B2 of another slave module in turn connected to the terminal B2 of the next slave module, etc . . . In an alternative embodiment the master module 1 comprises a second network terminal B2 connected to all the first network terminals B1 of the slave modules. In this case, the master module indicates which slave has the right to speak. In another alternative embodiment, the master and slave modules each only comprise a single terminal B (FIGS. 5 and 6), the network terminal of the master module being connected by carrier current to the network terminals of all the slave modules. Communication then takes place by time division under the control of the master module which indicates to each slave module the time interval reserved for it.

The invention claimed is:

1. A system comprising a digital communication network for data transmission, comprising audio type data, between a master module and a plurality of slave modules, each module comprising at least one network terminal to connect the communication network to the module, at least one network terminal of a slave module being connected to a network terminal of another module by means of the communication network, the system wherein the master module comprises a synchronization clock and supplies data frames comprising synchronization information on its network terminal, each slave module comprising clock reconstitution means, from the synchronization information of the data frames received on its network terminal, and recognition means, synchronized by the associated clock reconstitution means, to recognize the data intended for said slave module so as to ensure synchronous transmission of the data within the system, the system wherein all the data frames are generated by the master module.

2. The system according to claim 1, wherein each data frame comprises at least one packet, each packet comprising a header with a descriptor of the type and number of data contained in the packet, each module comprising means for determining, from the descriptor, whether a part of the packet is intended for it.

3. The system according to claim 2, wherein each slave module comprises means for inserting data to be retransmitted over the network in a predetermined part of a packet.

4. The system according to claim 1, wherein each data frame comprises command data intended for a slave module comprising means for applying the command data to an input or an output of the slave module.

5. The system according to claim 1, wherein each module is associated to a single address and each data frame comprises a preamble, a destination address, a source address, and the data to be transmitted from the module associated to the source address to the module associated to the destination address.

6. The system according to claim 5, wherein the master module supplies as destination address a broadcast address to transmit data simultaneously to all the slave modules.

7. The system according to claim 5, wherein the master module supplies as destination address a multicast address to transmit data simultaneously to a predetermined group of slave modules.

8. The system according to claim 1, wherein each data frame comprises a header specific to the application comprising a clock incrementation field incremented each time a frame is transmitted by the master module.

9. The system according to claim 1, wherein the synchronization clock has a frequency that is not a sub-multiple of the data sampling frequency.

10. The system according to claim 1, wherein the communication network comprises chain-connected modules, a first network terminal of at least one of the modules being connected to a second network terminal of a first slave module comprising a first network terminal, itself connected to a second network terminal of a slave module that is connected in series with the first slave module.

11. The system according to claim 1, wherein the communication network comprises star-connected modules, a network terminal of at least one of the modules being connected, by means of a switching unit, to a network terminal of at least two slave modules.

12. The system according to claim 1, wherein each slave module comprises means for transmitting a frame, without any modification, from one network terminal to another network terminal of said slave module.

13. The system according to claim 1, wherein the communication network is an Ethernet type network.

14. The system according to claim 1, wherein the communication network is a two-way network.

15. The system according to claim 1, wherein each module comprises a digital audio input, said module comprising means for transmitting digital audio data received on its audio input to its network terminal at predetermined data frame locations.

16. The system according to claim 1, wherein each module comprises a digital audio output, said module comprising means for synchronization and recognition of the data intended for said output in the data frames received on a network terminal of the module, and means for transmitting said data on its digital audio output.

17. The system according to claim 1, wherein each slave module comprises an analog audio output connected to a digital-to-analog converter.

18. The system according to claim 17, comprising a loudspeaker connected to the analog audio output of the slave module.

19. The system according to claim 1, wherein each data frame comprises video type data.

20. The system according to claim 1, wherein the slave module clock reconstitution means comprise means for minimizing jitter comprising a recursive digital filter arranged up-line from a phase lock loop.

* * * * *